United States Patent [19]

Knepper et al.

[11] Patent Number: 5,762,982
[45] Date of Patent: Jun. 9, 1998

[54] HEAT SETTING AND GAUGING APPARATUS

[75] Inventors: Carl Leroy Knepper, Troy; Timothy Lee Bright, Greenville; Jeffrey Lee Patrick, Huber Heights, all of Ohio

[73] Assignee: Electra Form, Inc., Vandalia, Ohio

[21] Appl. No.: 428,500

[22] Filed: Apr. 25, 1995

[51] Int. Cl.$^6$ .............. B29C 49/64; B29C 49/76
[52] U.S. Cl. .............. 425/526; 264/908; 425/445; 425/534
[58] Field of Search .............. 264/908; 425/526, 425/534, 445

[56] References Cited

U.S. PATENT DOCUMENTS

| | | | |
|---|---|---|---|
| 3,562,372 | 2/1971 | Schjeldahl et al. | 264/520 |
| 4,375,442 | 3/1983 | Ota et al. | 264/535 |
| 4,379,099 | 4/1983 | Ota et al. | 264/520 |
| 4,470,797 | 9/1984 | Harry et al. | 425/534 |
| 4,572,811 | 2/1986 | Ota et al. | 264/532 |
| 4,590,021 | 5/1986 | Ota et al. | 264/521 |
| 4,694,951 | 9/1987 | Gibbemeyer | 425/534 |
| 4,846,656 | 7/1989 | Denis et al. | 264/908 |
| 5,261,545 | 11/1993 | Ota et al. | 264/521 |

FOREIGN PATENT DOCUMENTS

| | | | |
|---|---|---|---|
| 109464 | 5/1984 | European Pat. Off. | 264/908 |
| 534367 | 3/1993 | European Pat. Off. | 425/526 |
| 58-173628 | 10/1983 | Japan | 264/908 |
| 6-134847 | 5/1994 | Japan | 425/526 |

OTHER PUBLICATIONS

Electra Form, Inc., "Off-Line Crystallizer Conveyor Specificaitons and Operation Documentation Release", dated Dec. 23, 1993.

*Primary Examiner*—Robert Davis
*Attorney, Agent, or Firm*—Locke Reynolds

[57] ABSTRACT

In a machine for promoting spherulite crystal growth in polyester bottle preform finishes, a gear arrangement for controlling the rate of vertical motion of a quill support platform to insure simultaneous engagement of all of the preforms onto adjacent gauges sized to a standard dimension for the preform finishes, the gear arrangement including two pairs of spur pinion gears positioned on opposite sides of the machine base engaging racks fixed to quill support platform and a plurality of rods fixed to the pinion gears and arranged in a rectangular array containing miter bevel gears fixed to the ends of the plurality of rods situated at the corners of the array, the miter bevel gears being engaged together in pairs to coordinate the rotation of all the rods and the vertical movement of the quill support platform.

16 Claims, 7 Drawing Sheets

HEAT SETTING AND GAUGING APPARATUS

FIELD OF THE INVENTION

The present invention relates to apparatus for use in the manufacture of plastic bottles, and particularly to apparatus for promoting spherulite crystal growth in the finish area of polyester bottle preforms and subsequently applying a gauge to the finish area to insure dimensional uniformity.

BACKGROUND OF THE INVENTION

Polyester, principally in the form of polyethylene terephthalate, has enjoyed widespread use in the manufacture of bottles for containing foods, beverages, certain chemicals, household cleaners, cosmetics and so forth. The widespread adoption of the bottles has been achieved primarily due to the advantageous characteristics of the bottles including the transparent character as well as high strength and light weight of thin walled containers which can be manufactured at a moderate price. The bottles are generally manufactured from an injection molded preform or parison which is then blown by compressed air into the final shape of the bottle within a blow mold, the blow molding process generally achieving a biaxial orientation of the bottle forming polymer. Typically, two portions of the container are not biaxially oriented or only minimally oriented. One minimally oriented portion includes the lower axial extremity of the container which typically coincides with the injection point for the polymer forming the parison. The other area where biaxial orientation does not generally occur is the finish area of the bottle surrounding the mouth which typically remains in the shape acquired during the injection molding process in the formation of the parison.

Techniques have been developed which permit containers of this type to be used to bottle liquids at temperatures near the boiling point of water. During such bottling processes, the polymer forming the container has a residual tendency to creep or deform. The usual filling operation includes a capping operation at the elevated temperature. The application of a cap or closure to the finish area of a container has a potential for encouraging the tendency for creep of the polymer and may otherwise deform the finish from the form created in the parison injection mold. Any deformation of the finish can contribute to failure of the seal with an applied closure and subsequently to spoilage of the container contents.

The creep of the polyester during such a hot fill operation can be diminished significantly by a heat setting operation whereby spherulite crystal growth is promoted in the finish area of the bottle or its preform as disclosed, for example, in U.S. Pat. No. 4,379,099. The method generally includes the insertion of a gauge element into the open mouth of the container or preform to assure proper sizing of the finish when the heat setting operation is completed. The use of such a gauge to size the interior of the mouth of blow molded plastic bottles is a well known procedure as seen for example from U.S. Pat. No. 3,562,372.

This and other prior art sought to apply the gauge to the interior of the finish area of a container or parison singly in a unit process. The speed of manufacture of the containers of this general type has increased so that large quantities of the parisons and containers are made simultaneously on largely automated equipment. Thus, there is a need for apparatus for heat setting the finish area of the containers which also has a sufficient volume and speed through the use of apparatus capable of sizing whole groups of parisons or containers simultaneously.

SUMMARY OF THE INVENTION

In accordance with the present invention, a finish heat setting machine promotes spherulite crystal growth in the finish area of such polyester bottles by applying heat to merely the finish area of groups of bottle preforms and subsequently subjecting the entire group of preforms to simultaneous contact with gauging elements which size the mouth opening of the containers. The machine itself includes a base and a plurality of heating lamps for heating only the finish portion of the polyester bottle preforms. The preforms are carried on a plurality of preform carriers which are arranged in groups. The preform carriers are movable with respect to the base with each preform carrier being a link or an element of a continuous chain or web carrying the preforms through the finish heat setting operation. Each preform carrier can include a plurality of preform carrier rods which protrude from the carrier. Each rod is received within the interior of a preform as the preforms are loaded onto the preform carrier. The preforms are preferably gravitationally loaded onto the preform carrier rods projecting upward from the carrier. The preform carrier, with the preforms in place, is moved adjacent to a support means which is spaced from the preform carrier by a distance which is designed to retain the preforms on the preform carrier rods as the carrier rods are inverted and while the preforms are heated by the heating means. The support means can take the form of a support platform in sliding contact with the closed end of the preform. The support means can also take the form of ledges straddling the preforms in sliding contact with the preform support ring lower surface. The ledges can additionally perform the function of shielding the preform body from the heating means.

Apparatus for dimensioning the preform finishes is located adjacent to the heating area and is visited by the preforms immediately following the heating process. The dimensioning apparatus includes a plurality of gauges sized to a standard dimension for the preform finish interior. In the preferred form, each gauge is fixed to one of the preform carrier rods adjacent to the preform carrier. A quill support platform is situated below and is vertically reciprocal with respect to the preform support platform. Quills which are preferably cylindrical are fixed vertically to the quill support platform in a pattern dimensioned to underlie each group of preform carriers as they are moved into position above the preform support platform and subsequent to the preform finish heating. Each quill has an upper end which is projectable through a corresponding opening in the preform support platform. The space within each quill includes a plug fixed to the machine base, the plug having an upper surface dimensioned to form a substantially continuous surface with the preform support platform and the upper ends of the quills when the quill support platform is in its lowermost position. As the quill support platform moves upward, the upper end of each quill contacts a lower surface of the support ring of the preform urging the preform upward onto the gauge associated with the carrier rod on which the preform is received. Where the preforms are supported on straddling ledges, the upward movement of the quill support platform causes the ledges to move out of the way of the rising quills.

The rate of vertical motion of the quill support platform is controlled by a gear means to insure simultaneous engagement of all of the preforms of a single group onto all of the associated gauges. The gear means preferably takes the form of two pairs of gears positioned on opposite sides of the quill support platform and coordinating means for coordinating the motion of the pairs of gears. The two gears preferably comprise racks which are engaged with spur pinion gears journaled to the base of the apparatus. The coordinating means preferably comprises a plurality of rods coupled to the two pair of gears, the rods being coupled together for coordinated movement. The movement coordination can be achieved by means of bevel gears fixed to the ends of at least some of the rods, the bevel gears being engaged together in pairs and the rods being arranged in the rectangular array journaled to the base of the apparatus.

Various features and advantages of the present invention will become apparent from a review of the following description of a preferred embodiment, the description referencing the accompanying drawings.

DETAILED DESCRIPTION OF THE INVENTION

Figure 1:
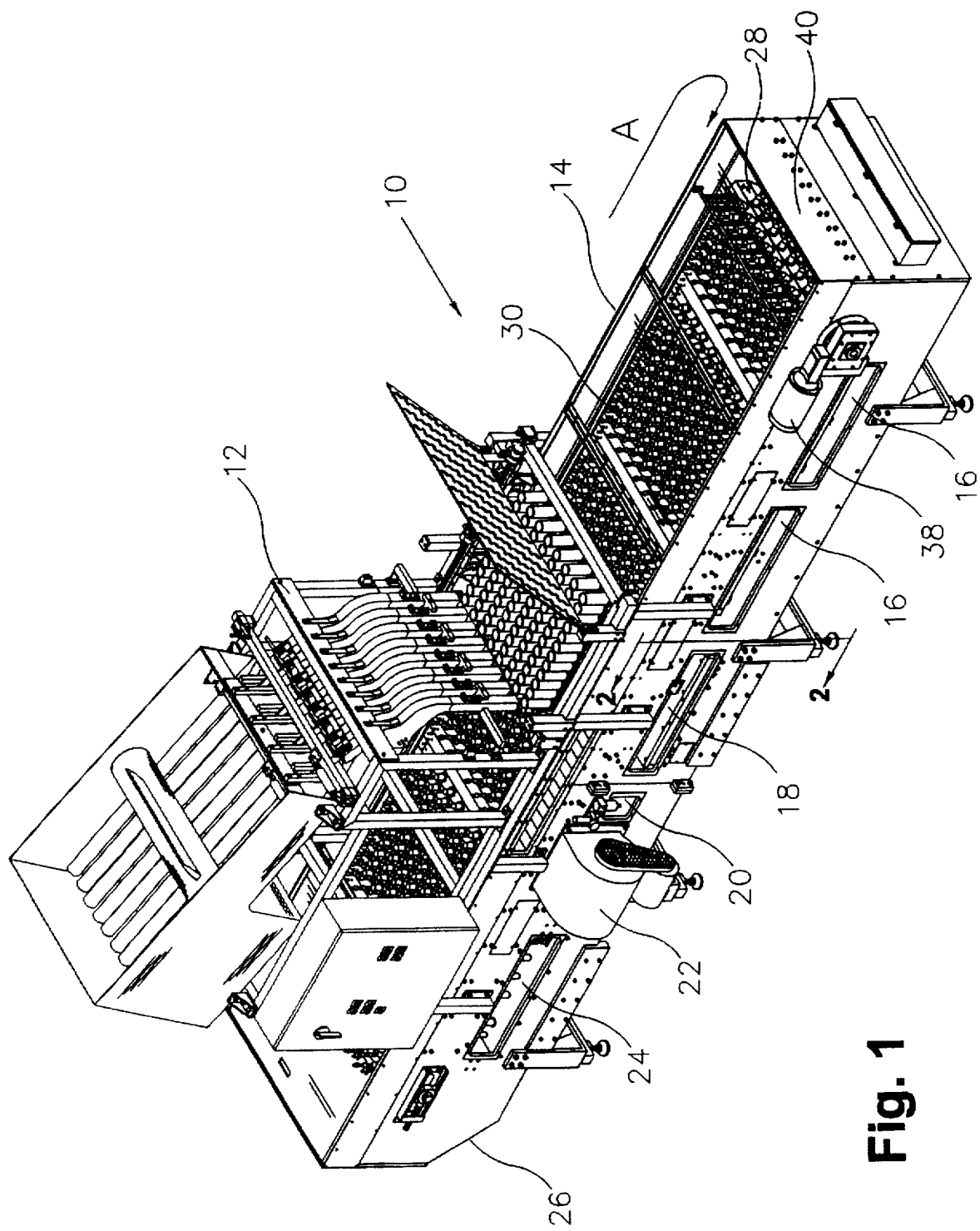
FIG. 1 is a perspective view of a preform crystallizer apparatus in accordance with the present invention.

A heat setting and gauging apparatus 10 is shown in FIG. 1 to comprise generally a preform loading apparatus 12 and a conveyor apparatus 14. The conveyor apparatus conveys sets of preforms loaded by the loading apparatus 12 in the direction A through two heating areas 16 where the finish area of the preforms is heated to a temperature known to induce spherulitic crystallization in the polyester forming the preforms. The conveyor apparatus 14 then conveys the preforms from the heating area 16 into a gauging area 18 where the finish diameter of the preforms is gauged to a preselected dimension. Following gauging, the conveyor apparatus 14 moves the preforms into a cooling area 20 where the preforms are cooled by air from blower 22 to the point that no thermal deflection or distortion of the preform finish is likely to occur. Subsequent to cooling, the conveyor apparatus transfers the preforms to a disengagement area 24 where the preforms are released from the finish gauges. The preforms are subsequently dispensed from output 26 into a receptacle not shown.

Figure 2:
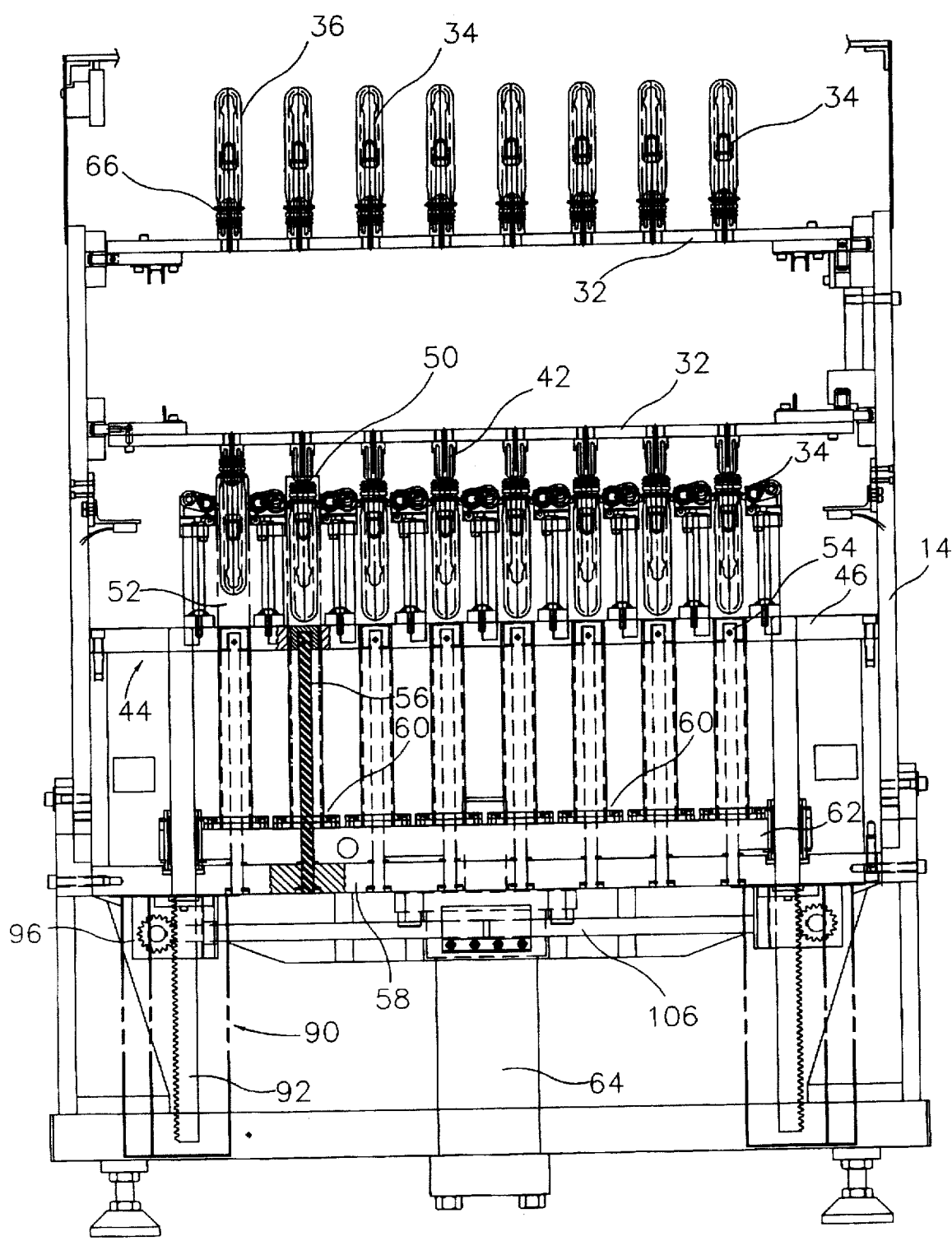
FIG. 2 is a sectional view of the apparatus shown in FIG. 1 taken along lines 2—2.

The conveyor apparatus 14 takes the form of a continuous chain or web 28 formed from a plurality of groups 30 of preformed carrier bars 32. As shown in FIG. 2, each bar 32 has a plurality of pins 34 extending outwardly from the bar 32 parallel to each other The pins 34 have a length short enough to be wholly received within the interior of the preform 36. Each pin 34 includes a gauge portion 42 situated at the junction or root of the pin 34 and bar 32. The bars 32 form the individual links of the belt or web 28 and a group of bars 32 containing a predetermined number of pins 34 forms a group 30 of a size adapted to receive a set of preforms from the loading apparatus 12 shown in FIG. 1. In a commercial embodiment of the present apparatus, each bar 32 includes eight pins 34 and twelve such bars 32 are coupled together to form a group 30 adapted to heat set and gauge ninety-six preforms simultaneously. The preforms are carried to the various areas 16, 18, 20 and 24 by means of motor 38 which steps the groups 30 through the various areas.

While the preform carriers 32 are situated on the upper portion of the conveyor apparatus 14, the pins 34 project upwardly and thus the preforms are held on the pins merely by the force of gravity. As each group 30 of preform carriers 32 traveling in direction A comes to end 40 of the conveyor apparatus, the pins 34 and preforms 36 become inverted so that the preforms are no longer retained on the pins by virtue of gravity. Instead, a preform support means in the form of platform 44, shown in FIGS. 2, 3 and 4, prevents the preforms 36 from disengaging from pins 34. The platform 44 can include troughs or grooves 45 which maintain the preforms 36 laterally centered with respect to pins 34, particularly in the heating section 16.

The support platform 44 in the gauging area 18 includes a generally continuous area 46 having circular openings 48. The circular openings 48 receive the upper ends 50 of cylindrical quills 52 which have an interior diameter slightly larger than the diameter of the body of the preforms 36. Inside each quill 52 is a plug 54 fixed to the upper end of rod 56. The lower end of rod 56 is fixed to a base plate 58 fixed to the frame of the conveyor apparatus 14. The tubular quills 52 have a lower end 60 fixed to a quill support plate 62 which is vertically reciprocable. The vertical reciprocation can be effected by means of a hydraulic or pneumatic piston and cylinder 64 or other equivalent means The upward motion of the quill support plate 62 causes the quills 52 to surround the preforms 36 with the upper ends 50 of the quills 52 ultimately contacting a lower surface of the support ring 66 on each preform 36, the continued upward motion causing the finish area 68 of the preforms 36 to be forced onto the gauges 42 to size the inner dimension of the preform finish.

Figure 3:
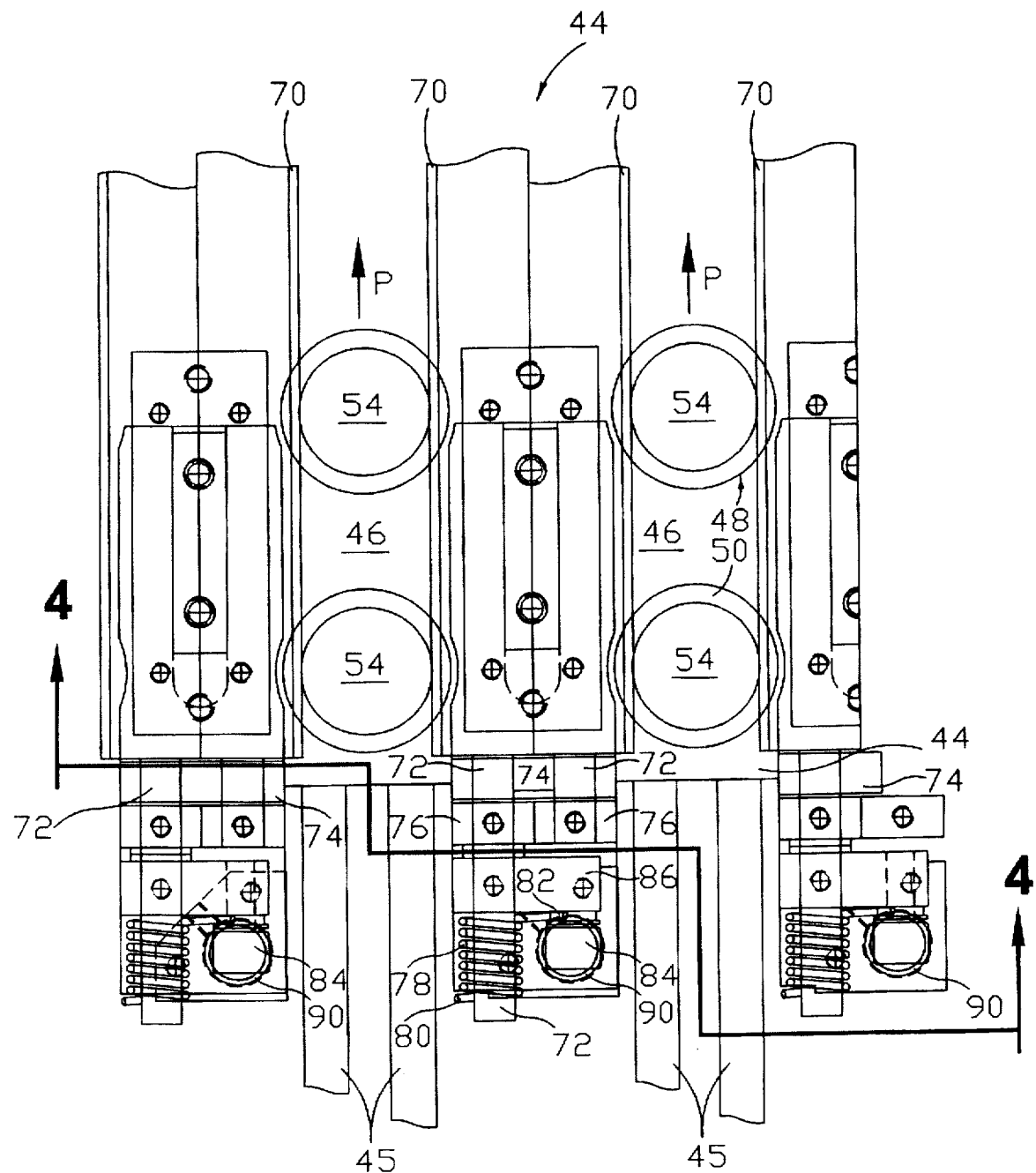
FIG. 3 is a plan view of the support platform showing the upper ends of the quills, and the supporting ledges straddling the preform courses.
Figure 4:
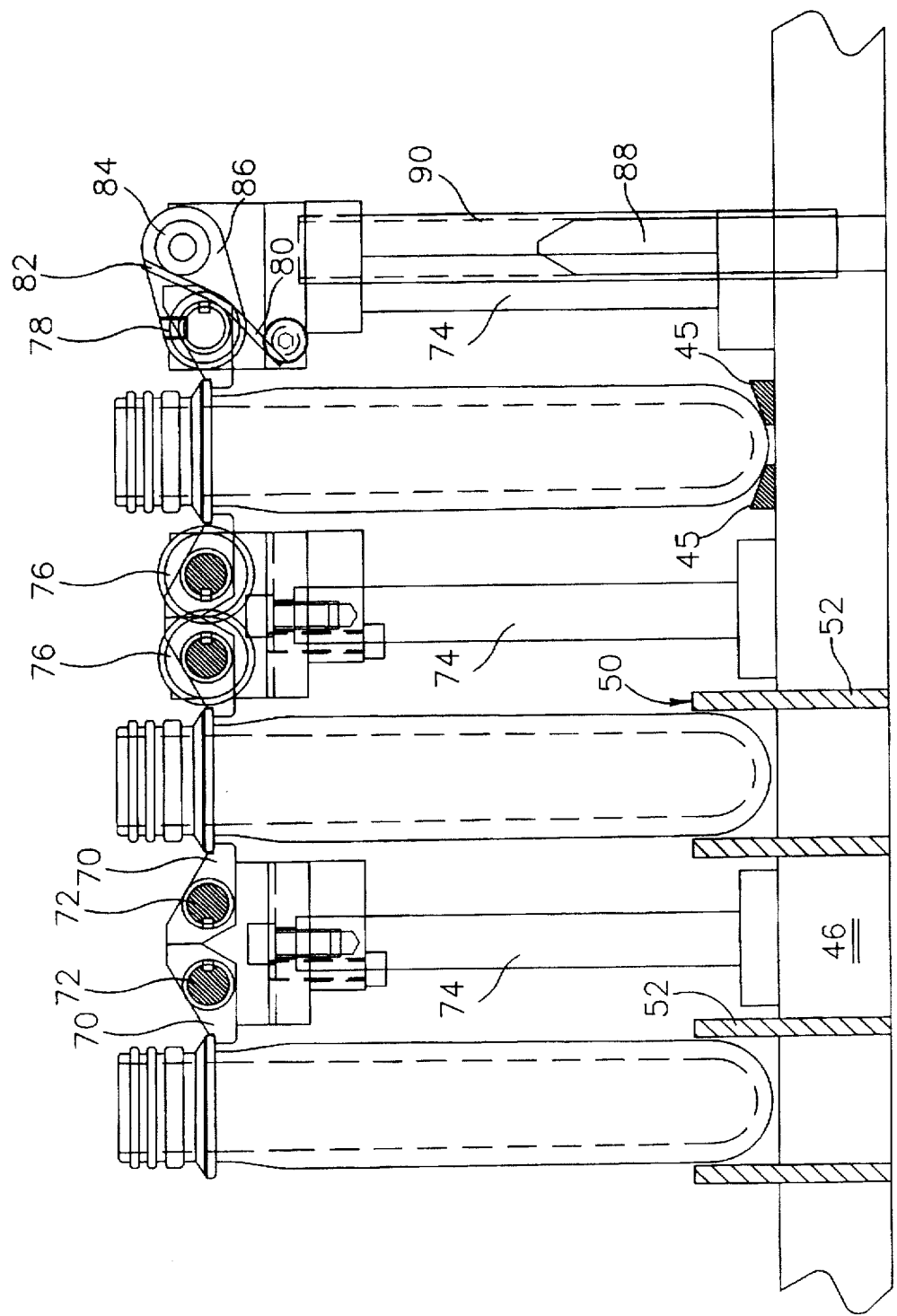
FIG. 4 is an end view taken along line 4—4 of FIG. 3 of the straddling preform support ledges prior to contact by the ledge release elements.
Figure 5:
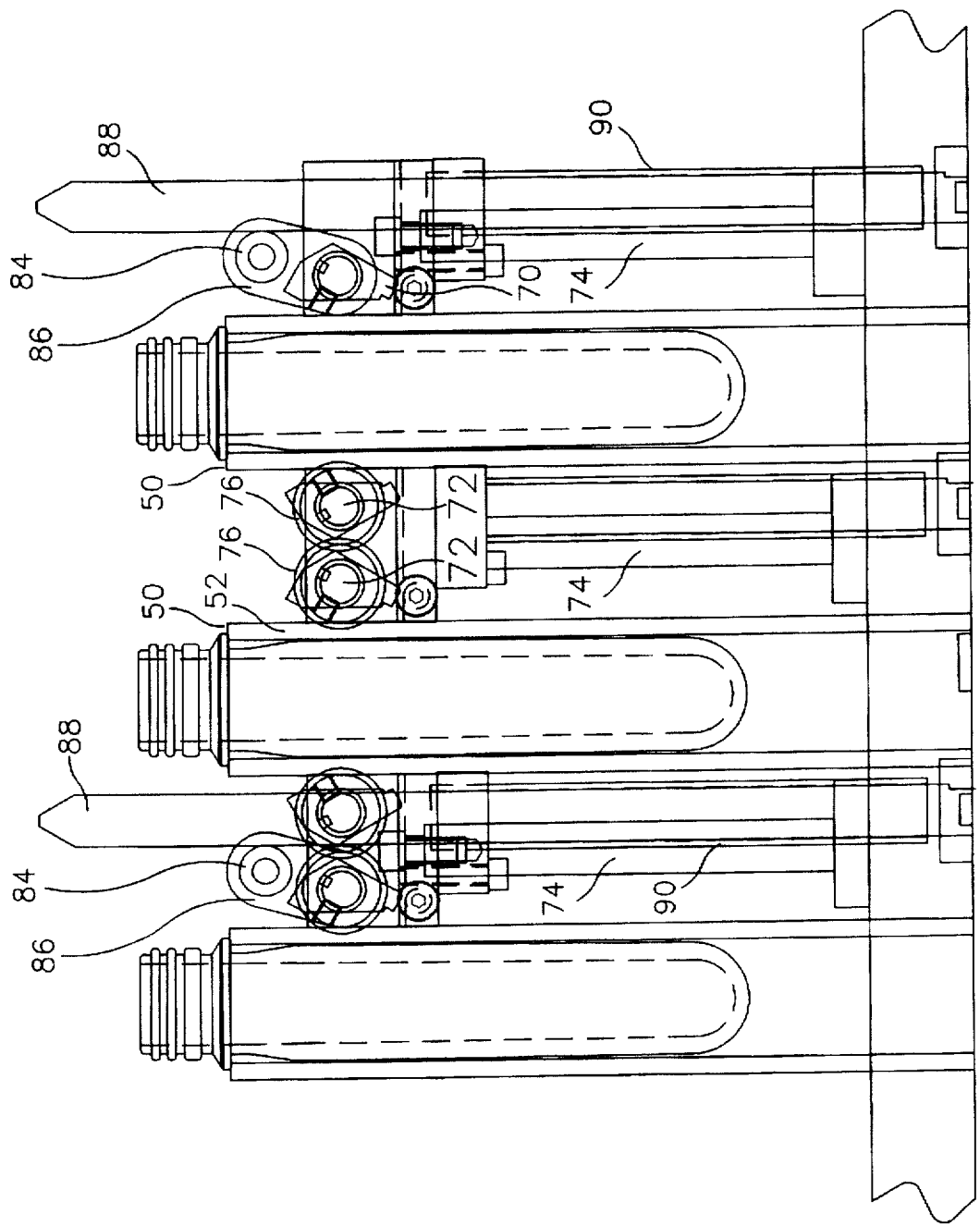
FIG. 5 is an end view similar to FIG. 4 of the straddling preform support ledges after contact by the ledge release elements
Figure 6:
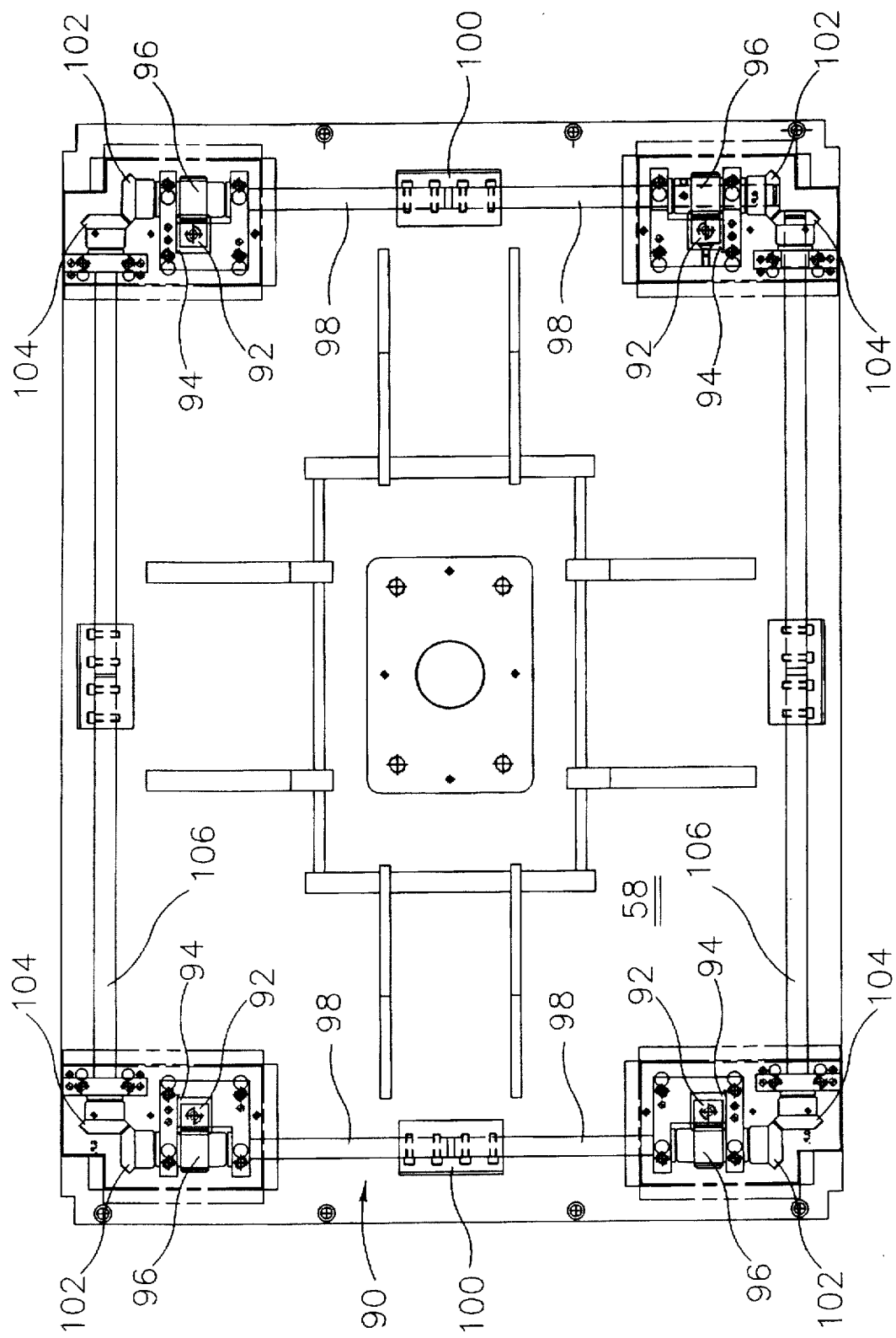
FIG. 6 is a bottom plan view of the preform crystallizer showing the apparatus for controlling the vertical motion of the quill support platform.
Figure 7:
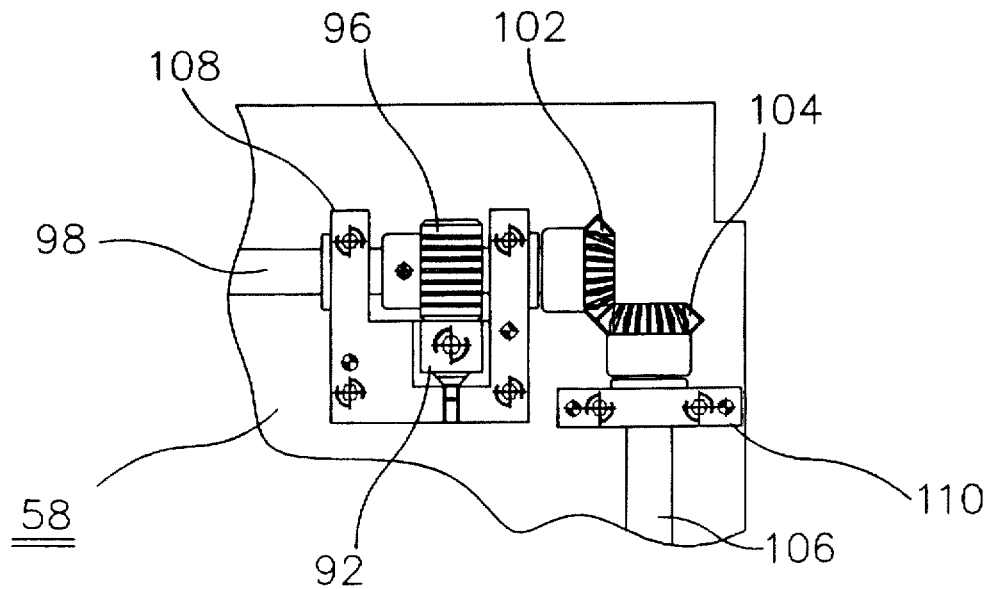
FIG. 7 is an enlarged bottom plan view of the bevel gears forming a portion of the control apparatus.
Figure 8:
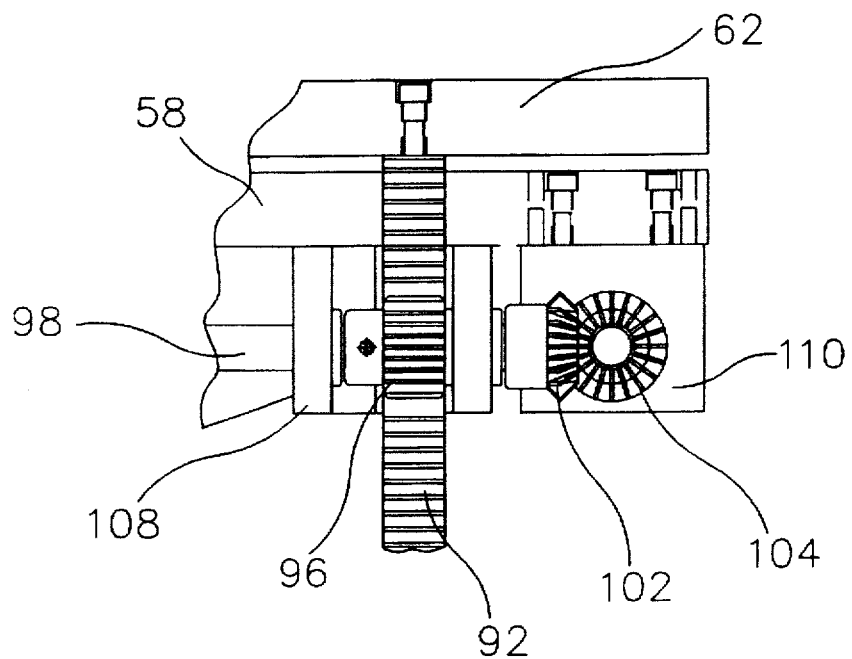
FIG. 8 is a detail side view of the control apparatus shown in FIGS. 4 and 5.

In a preferred embodiment shown in FIGS. 3, 4, and 5, the support means 44 takes the form of pairs of ledges 70 which straddle the paths P taken by the preforms as they travel through the gauging area 18. The ledges 70 are coupled to pivot rods 72 which are supported by stands 74 fixed to preform support platform 46. The pivot rods 72 are coupled together by gears 76 so that a pivotal motion of one ledge is matched by a pivotal motion of the adjacent ledge to which it is coupled as shown by the difference in position of the ledges 70 between FIGS. 4 and 5. The ledges 70 are biased toward a horizontal position as shown in FIG. 4 by means of springs 78 having a first end 80 fixed to stand 74 and a second end 82 applying a pressure against roller 84, the roller 84 being positioned at one end of a short link 86 forming a lever arm, the other end being coupled to pivot rod 72.

A plurality of pins 88 shown in FIGS. 4 and 5 project upwardly and are fixed for movement with the quill support platform 62. The pins 88 are received within sleeves 90 which direct the pins 88 into contact with rollers 84. Upward movement of the pins 88 subsequent to initial contact with the rollers 84 causes displacement of the links 86 and ledges 70 from the horizontal position shown in FIG. 4 to a inclined or displaced position as shown in FIG. 5. The vertical position of the pins 88 is fixed so that the displacement of ledges 70 takes place immediately before the upper ends 50 of quills 52 approach the lower surface of ledges 70. This allows the upper surface 50 of the quills 52 to contact the lower surface of the support ring 66 on the preforms 36 thus causing the preforms to be upwardly displaced into engagement on gauge portions 42.

It is important that the pins 88 and quills 52 move upward uniformly. A gear means 90 is employed to insure this uniform upward movement and thus the simultaneous engagement between the preforms 36 and the gauge portions 42. The gear means 90, illustrated in FIGS. 2, 6, 7 and 8, comprises a plurality of racks 92 fixed to a bottom surface of quill support platform 62. The racks 92 extend downward through openings 94 in base plate 58. A plurality of spur pinion gears 96 are journaled to the bottom of base plate 58 which engage the racks 92. These spur pinion gears 96 are coupled to rods 98 which are joined end-to-end by a split box coupling 100 which insures that each pair of adjacent racks 92 move simultaneously, either upward or downward. The ends of rods 98 not joined by coupling 100 are fixed securely to miter bevel gears 102. Similar miter bevel gears 104 are coupled to opposite ends of transverse rods 106 which together with rods 98 form a rectangular array insuring simultaneous and uniform upward and downward movement of all four racks 92 fixed to the bottom of quill support plate 62. The rods 98 are coupled to the bottom of the base plate 58 by means of bearing units 108 while rods 106 are coupled to the bottom of base plate 58 by means of bearing units 110.

Although the invention has been described in detail with reference to the illustrated preferred embodiment, variations and modifications exist within the scope and spirit of the invention as described and as claimed in the following claims.

The claimed invention is:

1. In a machine for promoting spherulite crystal growth in polyester bottle preform finishes, the machine comprising
a base and heating means for heating the finish portion of the polyester bottle preforms, a plurality of preform carriers arranged in groups and movable with respect to the base, each preform carrier including a plurality of preform carrier rods protruding therefrom, and a preform support platform spaced from the preform carriers to retain the preforms on the preform carrier rods while the preforms are heated by the heating means,
apparatus for dimensioning the preform finishes subsequent to heating comprising: a plurality gauges sized to a standard dimension for the preform finishes, each gauge being fixed to one of the preform carrier rods adjacent to one of the preform carriers, a quill support platform situated below and vertically reciprocal with respect to the preform support platform, a selected number of quills fixed vertically to the quill support platform in a pattern dimensioned to underlie each group of preform carriers moved into position above the preform support platform subsequent to preform finish heating, each quill having an upper end projectable through a corresponding opening in the preform support platform to urge one of the preforms toward one of the gauges, and gear means for controlling the rate of vertical motion of the quill support platform to insure simultaneous engagement of all of the preforms onto the gauges.

2. The apparatus of claim 1 wherein the gear means comprises two pairs of gears positioned on opposite sides of the quill support platform and coordinating means for coordinating the motion of the two pairs of gears.

3. The apparatus of claim 2 wherein said two pairs of gears comprise racks fixed to said quill support platform engaging spur pinion gears journaled to said base.

4. The apparatus of claim 2 wherein said coordinating means comprises a plurality of rods driven by said two pair of gears and coupling means for coupling the ends of the plurality of rods together for coordinated movement.

5. The apparatus of claim 4 wherein the coupling means comprises split box couplings fixing at least some of the ends of the plurality of rods together.

6. The apparatus of claim 4 wherein the coupling means comprises miter bevel gears fixed to at least some of the ends of the plurality of rods and engaged together in pairs.

7. The apparatus of claim 4 wherein said plurality of rods comprises a rectangular array containing at least two rods on each side of the array, and the coupling means comprises miter bevel gears fixed to the ends of the plurality of rods situated at the corners of the array, the miter bevel gears being engaged together in pairs and at least one split box coupling on each side of the array fixing the remaining ends of the rods to each other.

8. The apparatus of claim 4 further comprising bearing means coupling the plurality of rods to the base.

9. Apparatus for dimensioning preform finishes subsequent to heating of the finishes comprising: a base, a plurality gauges sized to a standard dimension for the preform finishes and arranged in a preselected pattern with respect to the base, a preform support means situated below the gauges for supporting the preforms below the plurality of gauges, a quill support platform situated below and vertically reciprocal with respect to the preform support means, a selected number of quills fixed vertically to the quill support platform in said preselected pattern to underlie the preform support means, each quill having an upper end projectable upward relative to the preform support means to urge one of the preforms toward one of the gauges, and gear means for controlling the rate of vertical motion of the quill support platform to insure simultaneous engagement of all of the preforms onto the gauges.

10. The apparatus of claim 9 wherein the gear means comprises racks fixed to the quill support platform engaging two pairs of pinion gears positioned on opposite sides of said base and coordinating means for coordinating the motion of the two pairs of gears.

11. The apparatus of claim 10 wherein said coordinating means comprises a plurality of rods driven by said two pair of pinion gears, couplings fixing at least some of the ends of the plurality of rods together, and bevel gears fixed to at least some other of the ends of the plurality of rods and engaged together in pairs for coordinated movement.

12. The apparatus of claim 11 further comprising a plurality of pillow box bearings coupling the plurality of rods to the base.

13. The apparatus of claim 9 wherein the preform support means comprises a preform support platform having an opening aligned with said upper end of each quill.

14. The apparatus of claim 9 wherein the preform support means comprises pairs of ledges straddling the quills having upper surfaces for contacting lower surfaces of support rings on the preforms.

15. The apparatus of claim 14 further comprising a pivot mounting coupled to the pairs of ledges to permit movement of the ledges away from contact with the preform support rings.

16. The apparatus of claim 15 further comprising moving means coupled to the quill support platform for moving the pivotally mounted pairs of ledges away from the preforms to permit the quill upper ends to contact the preforms.

* * * * *